United States Patent [19]

Blackmon, Jr.

[11] Patent Number: 4,838,618
[45] Date of Patent: Jun. 13, 1989

[54] APPARATUS AND METHOD FOR CHARGING BRAKE LINES OF RAILWAY VEHICLES

[76] Inventor: Howard A. Blackmon, Jr., 7713 Crestland La., Knoxville, Tenn. 36938

[21] Appl. No.: 235,043

[22] Filed: Aug. 19, 1988

[51] Int. Cl.⁴ .................... B60T 11/26; B60T 17/06
[52] U.S. Cl. ................................ 303/66; 303/86; 303/DIG. 3; 188/352
[58] Field of Search .............. 303/57, 58, 59, 60, 303/62, 63, 64, 65, 66, 67, 81, 86, 84.1, 84.2, 1, DIG. 3, 11, 8, 7, 33–38, 28, 29, 30; 188/352; 417/76, 197; 141/2, 4, 35; 213/1 R

[56] References Cited

U.S. PATENT DOCUMENTS

| | | | |
|---|---|---|---|
| 1,310,951 | 7/1919 | Higgins | 303/35 |
| 1,468,282 | 9/1923 | Coulombe | 417/76 |
| 1,896,404 | 2/1933 | Hale | 417/76 |
| 1,992,443 | 2/1935 | Reynolds | 303/86 X |
| 2,054,855 | 9/1936 | Farmer | 303/66 |
| 2,121,774 | 6/1938 | Ham | 303/86 |
| 2,159,781 | 5/1939 | Craig | 303/1 UX |
| 2,425,591 | 8/1947 | Birch | 303/64 |
| 2,844,412 | 7/1958 | Parker et al. | 303/86 |
| 2,855,247 | 10/1958 | Thompson | 303/86 |
| 2,942,917 | 6/1960 | Swander, Jr. | 303/57 X |
| 2,955,882 | 10/1960 | Juhlin | 303/29 |
| 3,158,409 | 11/1964 | Hughson et al. | 303/57 X |
| 3,194,608 | 7/1965 | Rich | 303/1 X |
| 3,572,849 | 3/1971 | Engle | 303/66 X |
| 3,945,684 | 3/1976 | Chellis | 303/1 |
| 4,046,492 | 9/1977 | Inglis | 417/197 |
| 4,307,917 | 12/1981 | Hasselbacher et al. | 188/352 X |

Primary Examiner—Douglas C. Butler
Attorney, Agent, or Firm—Luedeka, Hodges & Neely

[57] ABSTRACT

An apparatus and an associated method for charging the brake lines of a train of railway vehicles having an air-actuated braking system utilizes a flow amplifier to reduce the consumption of air during the charging operation.

18 Claims, 2 Drawing Sheets

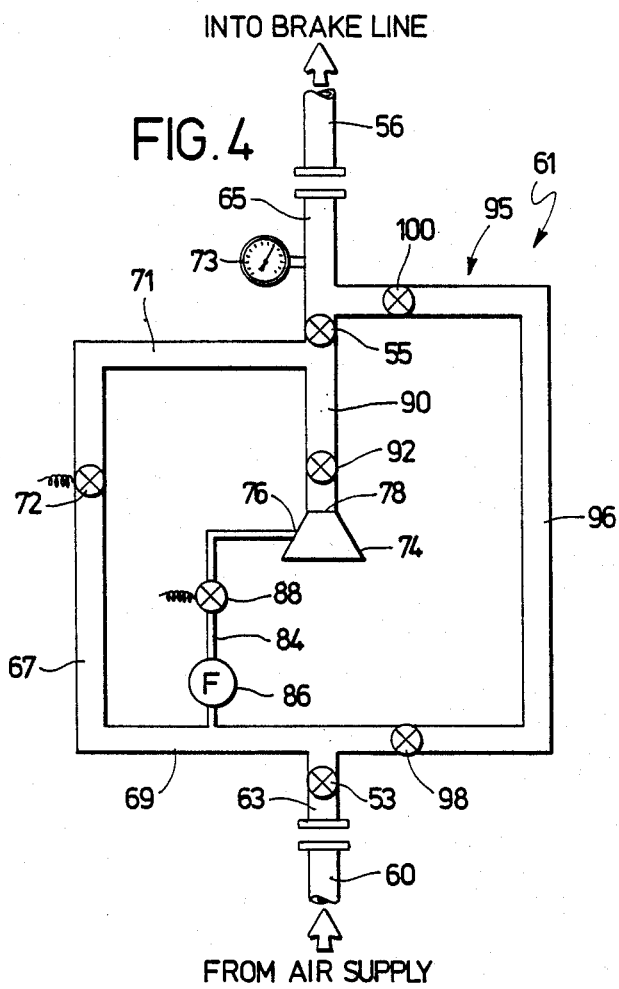
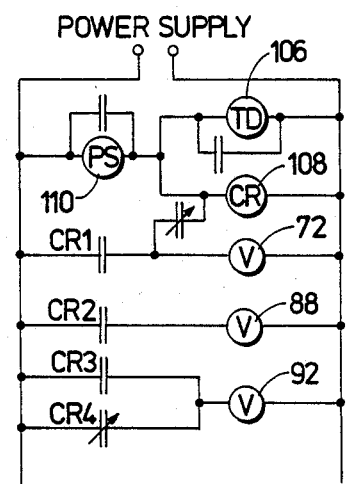
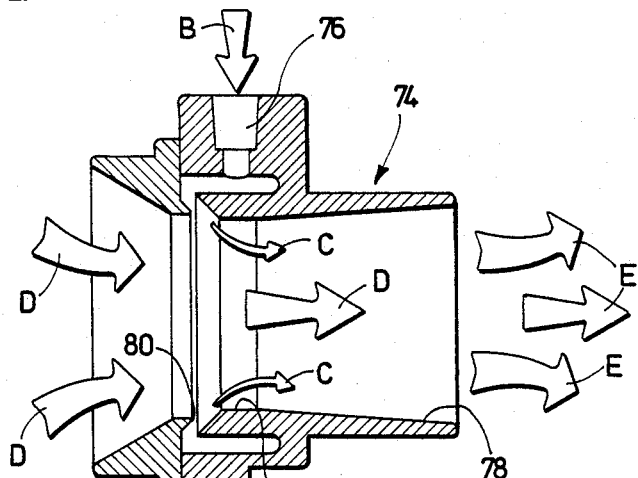

APPARATUS AND METHOD FOR CHARGING BRAKE LINES OF RAILWAY VEHICLES

BACKGROUND OF THE INVENTION

This invention relates generally to railway brake systems and relates more particularly to such a system which is air-actuated.

During the course of preparing a train of railway vehicles for travel at a railroad yard, the railway vehicles may be required to be uncoupled from one another for movement either singularly or in small groups of vehicles across a hump for subsequent couplement of the railway vehicles together in a prescribed order. Commonly, each railway vehicle in a train within which an air-actuated braking system is incorporated includes a brake line which is appropriately coupled to the brake line of every other vehicle in the train. Hence, when adjacent railway vehicles in the train are uncoupled from one another, the brake lines of the adjacent vehicles must be uncoupled as well so that subsequent recouplement of the railway vehicles together requires that the brake lines be recoupled and precharged to a prescribed pressure before the vehicles are returned to the service.

A charging operation of the brake lines of coupled railway vehicles is effected with the use of a compressed air source and is normally carried out in two phases. The first, or voluming-up, phase of the charging operation is carried out as the brake lines are coupled together and the second, or pressuring-up, phase is carried out while the coupled brake lines are sealed from the atmosphere and the internal pressure of the brake lines is raised to the prescribed pressure.

The voluming-up phase of the charging operation commences when the brake line of a first vehicle in the train is operatively coupled to the source of compressed air, such as may be supplied through trunk lines of a railroad yard from a powerful compressor of a type commonly situated at the yard, so that air from the source is directed through the brake line of the first vehicle and into the atmosphere. Equipment related to the brake line, such as piping and reservoirs, are thereby connected in flow communication with the compressed air to the brake line. The brake lines of adjacent vehicles are then coupled in sequence in an end-to-end fashion beginning with the brake lines of the first and a second of the railway vehicles and ending with the coupling of the brake lines of the next-to-last and last railway vehicles in the train. Upon coupling the brake lines of two adjacent vehicles, an operator performing the coupling operation ensures that the flow of air through the coupled brake lines is continuous by sensing the blowing of the air out of the uncoupled end of the coupled lines.

The pressuring-up phase of the charging operation commences when the brake line of the last railway vehicle in the train is sealed so that as air from the compressed air source continues to flow into the coupled brake lines, the internal pressure thereof begins to increase appreciably. When the internal pressure of the coupled brake lines reaches the prescribed level, and appropriate testing of the braking equipment is completed, the yard source of compressed air is disconnected from the brake line of the first vehicle and the railway vehicles await the locomotive source of compressed air.

A limitation associated with a conventional charging operation such as aforedescribed relates to the utilization of air under high pressure during the voluming-up phase of the operation. By supplying air at a high pressure to the brake lines, the energy expended and the related costs involved in the production of the high pressure air for the voluming-up phase of the operation are unnecessarily high.

Accordingly, it is an object of the present invention to provide a new and improved method and apparatus for charging the brake lines of a train of railway vehicles which conserves air from a source of compressed air.

Still another object of the present invention is to provide such an apparatus which automatically switches between voluming-up and pressuring-up modes of operation.

Yet another object of the present invention is to provide such an apparatus for preventing an appreciable loss of compressed air if a brake line were to rupture during the pressuring-up phase of a charging operation.

A further object of the present invention is to provide such an apparatus which reduces energy and labor costs involved in a brake-charging operation.

A still further object of the present invention is to provide such an apparatus which can save time during a brake-charging operation.

A yet further object of the present invention is to provide such an apparatus which enhances the safety of a brake-charging operation.

One more object of the present invention is to provide such an apparatus which is uncomplicated in construction and effective in operation.

SUMMARY OF THE INVENTION

This invention resides in an apparatus and method for charging the brake lines of a train of railway vehicles having an air-actuated braking system.

The apparatus of the present invention includes means defining an entry conduit, means defining an exit conduit, a flow amplifier, and means defining a high pressure conduit. The entry conduit is connectable to a source of compressed air under high pressure for receiving air from the compressed air source. The exit conduit is connectable to the brake line of a first railway vehicle of the train for directing air into the brake line. The flow amplifier has an inlet and an outlet wherein the inlet is in flow communication with the entry conduit and the outlet is in flow communication with the exit conduit. The high pressure conduit has two opposite ends wherein one of the ends is in flow communication with the entry conduit and the other of the ends is in flow communication with the exit conduit. The apparatus further includes valving means associated with the high pressure conduit and the flow amplifier so that when the entry and exit conduits are operatively connected between the source of compressed air and the brake line of the first railway vehicle, a flow of air from the compressed air source can be selectively routed into the brake line of the first vehicle through the flow amplifier in a manner bypassing the high pressure conduit for conserving air from the compressed air source or through the high pressure conduit in a manner bypassing the flow amplifier for delivering air at a higher pressure to the brake line of the first railway vehicle.

The method of the present invention includes the steps involved in charging the brake lines of a train of railway vehicles having an air-actuated braking system during the voluming-up phase of a charging operation.

The method includes the steps of providing a source of compressed air at relatively high pressure and directing a flow of compressed air from the source toward the brake line of a first of the railway vehicles. The flow of compressed air is then amplified by utilizing the flow of compressed air to draw air external to the source toward the brake line with the flow of compressed air to thereby produce an amplified flow. The amplified flow of air is then routed into the brake line of the first railway vehicle.

BRIEF DESCRIPTION OF THE DRAWINGS

FIG. 4 is a schematic view of the conduit arrangement of the apparatus of FIG. 3.

FIG. 5 is a longitudinal cross sectional view of the flow amplifier of the FIG. 3 apparatus.

FIG. 6 is a wiring diagram of the FIG. 3 apparatus.

DETAILED DESCRIPTION OF THE PREFERRED EMBODIMENTS

Figure 1:
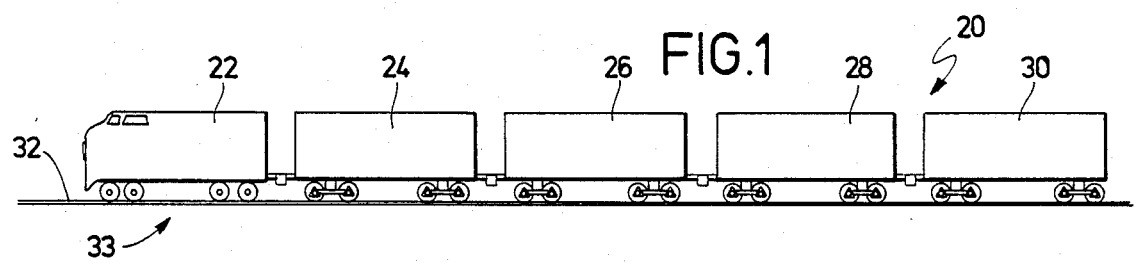
FIG. 1 is an elevational view of a train of railway vehicles having a braking system which is charged in accordance with the method of the invention.

Turning now to the drawings in greater detail and considering first FIG. 1, there is illustrated a train, generally indicated 20, comprised of a locomotive 22 and a plurality of railway vehicles 24, 26, 28, 30 operatively coupled together for movement along a railway track 32. Incorporated within the train 20 is an air-actuated braking system, generally indicated 33, of a type which is well-known in the art and wherein the brakes of each railway vehicle 24, 26, 28 or 30 are operatively coupled together for simultaneous actuation. To this end and with reference to FIG. 2, each railway vehicle 24, 26, 28 or 30 includes a brake line 34, 36, 38 or 40, respectively, operatively coupled in series relationship with every other brake line so that operation of the braking system 33 can be had by controlling the internal pressure of the coupled brake lines 34, 36, 38 and 40. Inasmuch as the coupled brake lines 34, 36, 38 and 40 are charged to a prescribed operating pressure at a railroad yard in preparation of the train 20 for travel, a charging operation of the coupled brake lines is carried out with the apparatus and method of the present invention in an effective manner and at relatively small cost.

Figure 2:
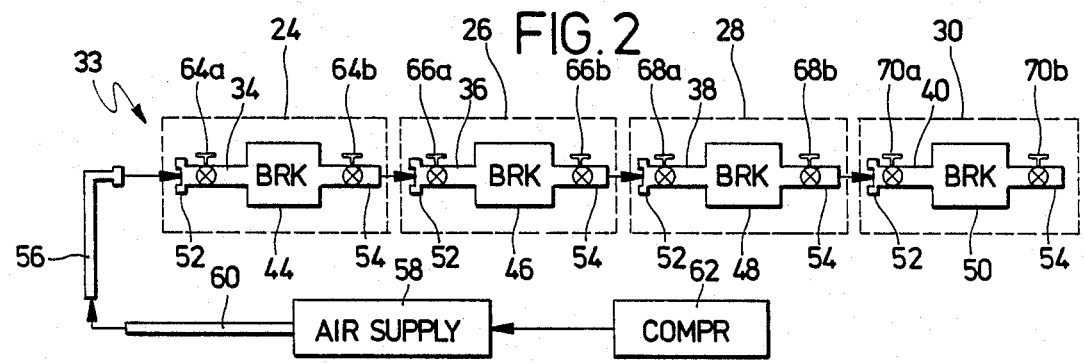
FIG. 2 is a schematic view illustrating in block diagram form the brake system of the FIG. 1 train.

With reference to FIG. 2, the brake system 33 of the train 20 includes a braking arrangement 44 associated with the first railway vehicle 24, a braking arrangement 46 associated with the second railway vehicle 26, a braking arrangement 48 associated with the third railway vehicle 28 and a braking arrangement 50 associated with the fourth railway vehicle 30. Each braking arrangement 44, 46, 48 or 50 includes piping and related braking equipment shown in FIG. 1 of U.S. Pat. No. 2,425,591 and the disclosure of which is incorporated herein by reference. Suffice it to say that each braking arrangement 44, 46, 48 or 50 includes the brake lines 34, 36, 38 or 40, respectively, wherein each line 34, 36, 38 or 40 includes an "A" end at the forward end of its corresponding vehicle and a "B" end at the rearward end of its corresponding vehicle and angle cocks 64a, 64b, 66a, 66b, 68a, 68b, 70a or 70b, in the form of shut-off valves mounted at corresponding ones of the "A" and "B" ends of the brake lines 34, 36, 38 or 40 as shown in FIG. 2. The "A" and "B" ends of each brake line 34, 36, 38 or 40 are designated in FIG. 2 as 52 and 54, respectively, and each is adapted for couplement to the corresponding end 54 or 52 of the brake line 34, 36, 38 or 40 of an adjacent vehicle or locomotive. Still further, there is associated with the brake line 34 of the first vehicle 24, a glad hand hose connector 56 through which air is directed for the purpose of charging the coupled brake lines 34, 36, 38 and 40.

Upon connecting the railway vehicles 24, 26, 28 and 30 together for travel along the track 32, the inlet end 52 and outlet end 54 of each brake line may or may not be disconnected from the brake lines of an adjacent vehicle depending upon whether the adjacent vehicles had been coupled together earlier. In any event, prior to the completion of a charging operation of the brake lines 34, 36, 38 or 40, the brake lines must be coupled together and sealed from the atmosphere and the angle cocks associated with the lines positioned in a manner permitting flow communication between coupled brake lines.

With reference still to FIG. 2, the coupled brake lines 34, 36, 38 or 40 are charged from a source 58 of compressed air having an air discharge hose 60. The source 58 contains air under a relatively high pressure which is supplied from a compressor 62 of a type commonly situated at a railway yard.

Figure 3:
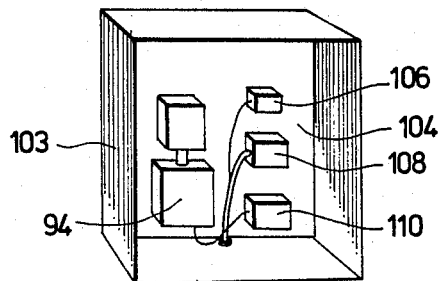
FIG. 3 is a perspective view of the apparatus in accordance with the present invention.
Figure 3:
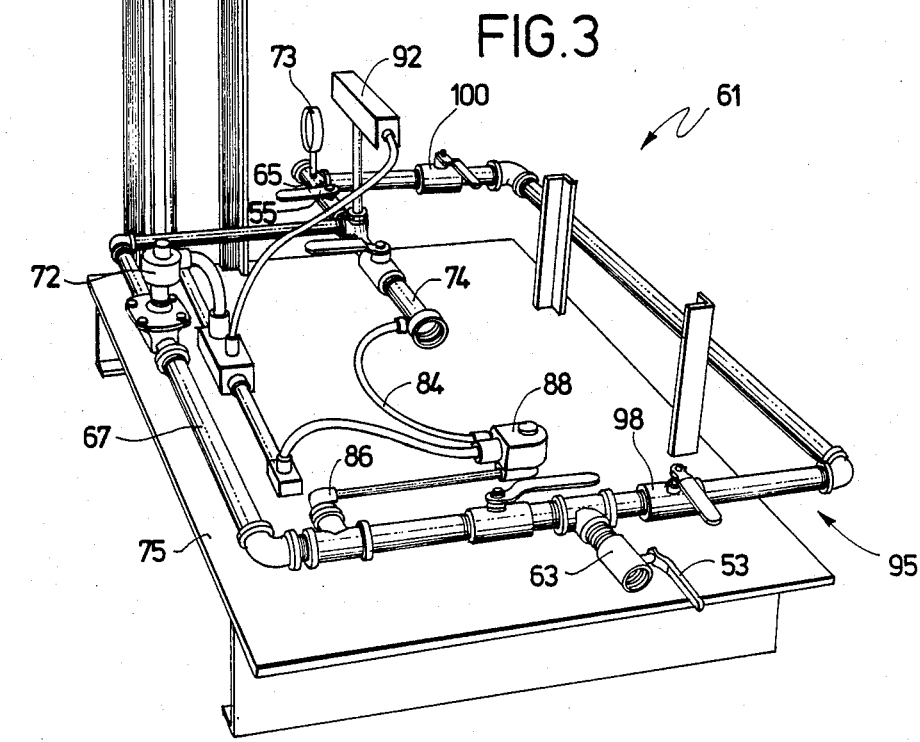

With reference to FIGS. 3 and 4, there is shown an apparatus, generally indicated 61, in accordance with the present invention for connection between the air discharge hose 60 and the hose connector 56. The apparatus 61 includes means defining an entry conduit 63 adapted for connection to the air discharge hose 60 and to thereby receive air from the source 58 and means defining an exit conduit 65 adapted for connection to the hose connector 56 through which air is routed into the brake line 34. There are associated with the entry and exit conduits 63 and 65, manual shutoff valves 53 and 55, respectively, and a system bypass 95 described herein. Connected between the entry and exit conduits 63 and 65 is a high pressure conduit 67 having two opposite ends 69 and 71 wherein one of the ends 69 is in flow communication with the entry conduit 63 and wherein the other end 71 is in flow communication with the exit conduit 65. Mounted within the high pressure conduit 67 is a normally-open solenoid valve 72 for a purpose apparent herein. Each of the aforedescribed apparatus components are supported upon a base 75.

In accordance with the present invention and with reference to FIGS. 4 and 5, the apparatus 61 includes an airflow amplifier, generally indicated at 74, having an inlet 76 and an outlet 78 and adapted to amplify the volumetric flow of air directed through the inlet 76 and thus produce an amplified flow in outlet 78. The airflow amplifier 74 is considered as a high flow, low suction device of a type which is commercially available under the trade designation Transvector from the Vortec Corporation, Cincinnati, Ohio.

With reference to FIG. 5 and during an operation of the airflow amplifier 74, air enters the inlet 76 along a path indicated by arrow B and is deflected toward the outlet 78 along an annular path indicated by arrows C as the air exits an annular slot 80 defined within the body of the amplifier 74. A small suction is thereby created in the body of the amplifier 74, and as a consequence, atmospheric air is pulled within the amplifier body along paths indicated by arrows D and moved through and out of the amplifier outlet 78 with the air routed through the inlet 76 along paths indicated by arrows E. It is believed that the structure and operation of the Transvector is described in detail in U.S. Pat. No. 4,046,492, incorporated herein by reference. Furthermore and in accordance with data set forth in literature available from the Vortec Corporation entitled A SHORT COURSE ON TRANSVECTOR AIR FLOW AMPLIFIERS WITH APPLICATION NOTES, copyright 1976, whose disclosure is incorporated herein by reference, amplification ratios of about forty to one are obtainable with the Transvector amplifier 74 with relative ease.

With reference again to FIG. 4, the apparatus 61 includes a first passageway conduit 84 operatively joined between the high pressure conduit 67 and the inlet 76 of the amplifier 74 so that the amplifier inlet 76 is in flow communication with the entry conduit 63. Furthermore, there is associated with the passageway conduit 84 an air filter 86 for filtering air routed through the conduit 84 and a normally-closed solenoid valve 88. The diameter of the passageway conduit 84 is substantially less than that of the high pressure conduit 67, and in a preferred form of the apparatus 61, the diameter of the conduit 84 is about 0.25 inches and the diameter of the high pressure conduit 67 is about 1.0 inches. For use in the apparatus 61, a flow amplifier is chosen which preferably has a throat opening 83 (FIG. 5) which is smaller than the smallest opening expected to be encountered downstream of the amplifier to avoid the risk of blowback through the amplifier. Therefore, if the diameter of the smallest opening of the brake lines connected downstream of the amplifier is about 1.0 inches, a flow amplifier having a throat diameter of about 0.79 inches (such as is provided by a Transvector Model 912) can be used.

The apparatus 61 further includes a second passageway conduit 90 operatively joined between the outlet 78 of the amplifier 74 and the high pressure conduit 67 so that the amplifier outlet 78 is in flow communication with the exit conduit 65. Still further, there is associated with the passageway conduit 90 a normally-closed motor operated valve 92 and a transducer 94.

As best shown in FIG. 3, the apparatus 61 includes a control box 103 supported generally above the assembly of apparatus conduits, and the transducer 94 is operatively housed within the box 103. The apparatus 61 further includes control componentry including a time delay relay 106, a control relay 108, a pressure switch associated with the transducer 94, and a pressure control switch 110. The aforedescribed control componentry is operatively wired together and with the valves 72, 88, and 92 in accordance with the simplified wiring diagram of FIG. 6. It will be noted that the control relay 108 includes four contacts designated CR1, CR2, CR3 and CR4, and that the contacts CR3 and CR4 are operatively connected to the motor-operated valve for opening and closing the valve 92.

The pressure transducer 94 and switch (FIG. 3) cooperate to energize (i.e., cut-in) the control relay 108 upon a sensing of a predetermined pressure below a selected pressure level between the outlet 78 of the amplifier 74 and the exit conduit 65 and to de-energize (i.e., cut-out) the control relay 108 upon a sensing of the preselected pressure level. Although such cut-in and cut-out levels can be adjusted by means of the pressure control 110, it has been found that a cut-out level of about forty-eight psig and a cut-in pressure differential of about ten psig below about forty-eight psig are suitable for operation of the apparatus 61. The time delay relay 106 acts as a holding circuit for the control relay 108 and holds the control relay in a closed condition while the motor-operated valve has time to operate for a preselected period of time (e.g. ten seconds) and thereby move to its open condition. In contrast, the valve 72 closes immediately upon energization of the control relay 108.

During an operation of the apparatus 61 and upon a sensing of a ten pound pressure drop downstream of the amplifier outlet 78, such as may be sensed if conduit 65 were pressurized and suddenly opened to the atmosphere, the transducer 94 energizes the control relay 108 for closing the valve 72 and opening the valves 88 and 92. It has been found that the time delay relay 106 interposed between the valve 92 and control relay 108 circumvents difficulties which may arise from pressure fluctuations in the apparatus conduits as the valve of the motor-operated valve 92 is moved off of its seat and thus promotes pressure stabilization during a switching of the apparatus 61 from one mode of operation to another. It is to be understood that with the valve 72 closed and the valves 88 and 92 opened, the apparatus 61 is in a voluming-up mode of operation, and with the valve 72 opened and the valves 88 and 92 closed, the apparatus 61 is in a pressuring-up mode of operation.

The apparatus 61 remains in its voluming-up mode of operation until the pressure transducer 94 senses that a predetermined pressure level as measured at the outlet of the amplifier 74 has been reached. Once the predetermined pressure level is reached, the control relay 108 is deenergized so that the valve 72 returns to its normally-opened position and the valves 88 and 92 return to their normally closed condition.

It follows from the foregoing that when the pressure differential sensed across the pressure switch 110 is at least ten pounds, air is permitted to flow from the entry conduit 63 to the exit conduit 65 through the amplifier 74 in a manner bypassing the high pressure conduit 67. Conversely, when the pressure in conduit 90 is above the predetermined pressure, air is permitted to flow from the entry conduit 63 to the exit conduit 65 through the high pressure conduit 67 in a manner bypassing the amplifier 74.

With reference again to FIG. 4, the system bypass 95 of the apparatus 61 includes a bypass conduit 96 operatively connected between the entry and exit conduits 63 and 65 as shown in FIG. 4. Operatively associated with the bypass conduit 96 are two normally-closed manual valves 98 and 100. The manual valves 98 and 100 provide means by which air routed from the entry conduit 63 to the exit conduit 65 is permitted to bypass both the amplifier 74 and conduit 67.

To perform a charging operation with the apparatus 61 and with reference still to FIG. 4, the entry conduit 63 is operatively coupled to the discharge hose 60 for receiving compressed air from the compressed air source 58 and the exit conduit 65 is operatively coupled to the connector or train line hose 56 of the brake line 34 for directing air routed out of the apparatus 61 into the brake line 34. It will be understood that the pressure at which the air is stored within the compressed air source 58 is maintained at a higher level than the level of the predetermined pressure below which air is routed through the apparatus 61 by way of the amplifier 74. Therefore, as a result of the couplement of the entry conduit 63 to the hose 60 by opening valve 53, for example, the pressure switch 110 senses the pressure (normally much greater than ten pounds) in the apparatus conduit 90 as compressed air is permitted to escape into the atmosphere through the brake line 34 and, at a predetermined set point, switches the apparatus, 61 to the voluming-up mode of operation. More specifically, the pressure switch 110 senses the pressure drop necessary to switch the mode of operation of the apparatus 61 to the voluming-up mode and, in response thereto, is responsible for moving the valve 72 to its closed condition and for moving the valves 88 and 92 to their opened condition. Air routed from the compressed air source 58 through the amplifier 74 is thereby directed into the hose connector 56 in a manner bypassing the high pressure conduit 67.

With the air from the compressed air source being routed through the brake line 34 and into the atmosphere, an operator can ensure that the airflow through the brake line is continuous by simply placing his hand at a location, such as for example the exposed outlet end 54 at which the compressed air would normally escape to the atmosphere, to feel whether or not air is blowing out of the location or listen for the airflow which should be blowing out of the location. If air is not blowing into the atmosphere as it should be, repairs to the brake line 34 may be in order. If, on the other hand, air is blowing into the atmosphere as it should be, the outlet end 54 of the line 34 is operatively coupled to the inlet and 52 of the next brake line 36 and the angle cock 64b is positioned so that air entering the hose connector 56 flows through the outlet end 54 of the brake line 36.

The operator then proceeds to ensure that the flow of air through the coupled brake lines 34 and 36 couples the outlet end 54 of the brake line 36 to the inlet end 52 of the brake line 38 and then opens the angle cock 66b to accommodate the flow of air through the outlet end 54 of the line 38. Upon opening the angle cock 66b, , the operator checks for a continuous flow of air through the coupled brake lines 34, 36 and 38 at the brake line 38, subsequently couples the outlet end 54 of the brake line 38 to the inlet end 52 of the brake line 40, and then opens the angle cock 68b to accommodate the flow of air through the outlet end 54 of the brake line 40. The outlet 54 of the brake line 40 is thereafter sealed from the atmosphere by, for example, appropriately setting the position of the angle cock 70b. It follows from the foregoing that angle cocks 64a, 66a, 68a and 70a must be set in an open condition to permit flow communication between coupled brake lines 34, 36, 38 and 40.

Upon couplement of the brake lines 34, 36, 38 and 40 together and sealing the coupled brake lines from the atmosphere as aforedescribed, the internal pressure of the coupled lines begins to increase appreciably as a consequence of the continuous stream of compressed air being directed into the coupled lines through the hose connector 56. The air continues to be routed into the hose connector 56 through the amplifier 74 until the internal pressure of the coupled brake lines, as sensed by the transducer 94 at the exit conduit 65, reaches the predetermined or threshold pressure. At that point, the transducer 94 switches the apparatus 61 to the pressuring-up mode of operation by permitting the valve 72 to open and valves 88 and 92 to close. Air routed through the apparatus 61 is thereby redirected to the hose connector 56 by way of the high pressure conduit 67 so that the flow amplifier is bypassed. The compressed air continues to be routed into the hose connector 56 through high pressure conduit 67 until the internal pressure of the coupled brake lines 34, 36, 38 and 40 reaches the desired prescribed pressure for operation. Such a prescribed operating pressure may fall within the range of about 65 to 80 psig. At, that point, the exit conduit 65 is disconnected from the hose connector 56, the angle cock 64a is closed and the hose connector 56 is disconnected from the brake line 34 to complete the precharging operation. In practice, the coupled brake arrangements 44, 46, 48 and 50 are commonly tested, such as for example to check the distance of permitted brake piston travel, before the compressed air source 58 is disconnected from the coupled brake lines 34, 36, 38 and 40.

It follows from the foregoing that the apparatus 61 remains in its voluming-up modes of operation until every railway vehicle 24, 26, 28 and 30 of the train 20 is coupled and the brake lines are solid. Upon closing of the angle cock 70b, a build-up of back pressure is sensed at the transducer 94. Once the back pressure reaches a prescribed level, such as, for example, 0.037 inches of water or forty-eight psig, the valve 72 is opened and the valves 92 and 88 are closed. With valves 92 and 88 in a closed condition and valve 72 in an opened condition, air flows through the high pressure conduit 67 into the coupled brake lines 34, 36, 38 and 40 to complete the pressuring-up phase of the charging operation. Upon testing the coupled brake arrangements 44, 46, 48 and 50 as desired, the hose connector 56 is removed from the brake line 34 and the coupled vehicles 24, 26, 28 and 30 await hook-up to the locomotive 22 (FIG. 1). In service, the coupled brake lines 34, 36, 38 and 40 receive compressed air for operation from locomotive-generated power.

The apparatus 61 is advantageous in that it conserves compressed air from the source 58 during the voluming-up phase of the charging operation during which compressed air is permitted to escape into the atmosphere by way of the unsealed brake lines. Such a phase does not require that a large quantity of highly compressed air be routed through the brake lines. More specifically, and as outlined above, since air is routed through the brake lines during the voluming-up phase for the purpose of ensuring continuous flow through the sequentially-coupled brake lines, a stream of air at relatively low pressure with a sufficient high volumetric flow rate is all that is necessary for routing into the coupled brake lines. Therefore, the apparatus 61, by means of the passageway conduit 84 of reduced diameter and the airflow amplifier 74, is responsible for restricting the flow of compressed air from the source 58 into the hose connector 56 and amplifying the airflow routed therein with a high volume of atmospheric air. When, on the other hand, air is desired to be delivered to the coupled brake lines for the purpose of raising the internal pressure thereof from the predetermined pressure to the desired operating pressure, the apparatus 61 automatically reroutes the stream of air delivered to the hose connector 56 though the high pressure conduit 67 of larger diameter and in a manner bypassing the passageway conduit 84 and the airflow amplifier 74. Hence, the amount of compressed air utilized from the source 58 for a voluming-up phase of the precharging operation is conserved and the energy consumption by the compressor 62, and thus the attending costs involved to generate the compressed air, are kept relatively low.

It is known that at a railway yard which utilizes compressors for brake-charging purposes, the amount of energy consumption by the compressors represents a large fraction of the total energy consumption at the yard. Hence, it is believed that by utilizing the apparatus 61 to reduce the energy consumption of the compressors, the savings in total energy usage at the yard and the attending energy costs of the yard can be significant.

Another advantage of the apparatus 61 relates to the reduction in time required to perform a brake-charging operation when compared to conventional methods. For example, during a conventional method utilizing large quantities of high pressure air for a voluming-up operation, the pressure loss in the yard trunk line or surge tank can be so significant that the compressors must be given time to return the tank line to a desirable pressure level for subsequent charging operations. Similarly, if the railway vehicles in more than one train are in a condition in the yard ready for charging, the drain of high pressure air from the trunk line to charge one train may prevent a simultaneous charging of another train. By interposing the apparatus 61 between the yard trunk line and the brake lines of the vehicles to be charged, the air contained within the trunk line can be maintained, at least during the voluming-up stage, at a high level so that simultaneous charging of the brake lines of more than one train is permitted.

Still another advantage provided by the apparatus 61 relates to a conserving of compressed air if the coupled brake lines were to rupture during the course of the pressuring-up phase of the operation. For example, upon rupture of the coupled brake lines during the pressuring-up phase so that the pressure therein suddenly drops by about ten psig, the pressure switch 110 returns the apparatus 61 to the voluming-up mode, or the mode at which the airflow from the source 58 is routed through the amplifier 74, so that the amount of compressed air which may otherwise escape into the atmosphere by way of the high pressure conduit 67 is greatly reduced. The same advantage is realized, of course, in the event that any of the lines downstream of the apparatus 61 become ruptured or begin to leak sufficient to cause the prescribed drop in pressure.

Yet further and because the voluming-up phase of a brake-charging operation is performed with air at relatively low pressure, an operator charging the line is less likely to be harmed by air during the voluming-up phase than he would be if the air were at a relatively high pressure. Hence, during the course of a brake-charging operation, the apparatus 61 lessens the time during which an operator is exposed to high pressure air and is believed to be advantageous in this respect.

It will be understood that numerous modifications and substitutions can be had to the aforedescribed embodiments without departing from the spirit of the invention. For example, although the apparatus 61 has been shown and described as including means for automatically switching the apparatus between the voluming-up and pressuring-up modes, an apparatus in accordance with the present invention may include means permitting an operator to manually switch the apparatus between such operating modes. In such an embodiment, the valves associated with the bypass and passageway conduits are manually-controlled and a pressure gauge 73 operatively mounted in the exit conduit 65 is monitored by an operator to visually indicate to the operator the moment that the internal pressure of the coupled lines reaches the predetermined pressure.

Still further although the apparatus 61 has been described for interposing between the yard trunk line and coupled brake lines for conserving high pressure air generated at the yard, the apparatus 61 can be interposed between the compressor of a locomotive and the coupled brake lines for conserving high pressure air generated by the locomotive. Accordingly, the aforedescribed embodiments are intended for the purpose of illustration and not as limitation.

What is claimed is:

1. A method for charging the brake lines of a train of railway vehicles having an air-actuated braking system during the voluming-up phase of a charging operation, said method including the steps of:
   providing a source of compressed air at relatively high pressure;
   directing a flow of the compressed air from the source toward the brake line of a first of the railway vehicles;
   amplifying the volume of air directed toward the brake line by utilizing the flow of compressed air to draw air external to the source toward the brake line with the flow of compressed air to thereby produce an amplified flow; and
   routing the amplified flow of air to the brake line of the first railway vehicle.

2. The method of claim 1 wherein said step of amplifying includes a step of providing a flow amplifier and a step of operatively interposing the flow amplifier between the source of compressed air and the brake line of the first railway vehicle so that the directed flow of compressed air is routed from the source and into the brake line.

3. A method for charging the brake lines of a train of railway vehicles having an air-actuated braking system, said method including the steps of:
   providing a source of compressed air at relatively high pressure;
   providing a flow amplifier;
   directing a flow of compressed air through the flow amplifier and into the brake line of a first of the railway vehicles so that an amount of air is directed into the brake line at a relatively high volumetric flow rate and at a relatively low pressure; and
   redirecting the flow of compressed air into the brake line of the first vehicle in a manner bypassing the flow amplifier when the internal pressure of the brake line elevates to a predetermined level above the relatively low pressure, which predetermined level is below the operating pressure level of the brake line, so that compressed air from the source is conserved until high pressure air is required to elevate the pressure of the brake line from the predetermined level to the operating level.

4. The method as defined in claim 3 wherein said step of redirecting the flow of compressed air is preceded by the step of sensing the internal pressure of the brake line of the first vehicle so that said step of redirecting the flow is effected when the sensed internal pressure elevates to the predetermined level.

5. The method as defined in claim 3 wherein said step of directing is followed by a step of coupling the brake lines of uncoupled adjacent railway vehicles together in series relationship beginning with the coupling of the brake lines of the first and a second uncoupled adjacent railway vehicles encountered in the train of the railway vehicles and ending with the coupling of the brake lines of the next-to-last and last uncoupled adjacent railway vehicles encountered in the train railway vehicles.

6. The method as defined in claim 5 wherein the brake line of the last railway vehicle in the last pair of adjacent uncoupled vehicles is open to the atmosphere at the outset of the coupling step and said redirecting step is preceded by a step of sealing the brake line of said last railway vehicle from the atmosphere so that the coupled brake lines are thereby sealed from the atmosphere and the internal pressure of the coupled brake lines is thereby permitted to appreciably elevate.

7. The method as defined in claim 3 wherein said step of coupling is preceded by the steps of providing a conduit containing air under pressure from the compressed air source and routing a flow of compressed air from said conduit into the brake line of the first vehicle in a manner bypassing the flow amplifier and said step of directing includes a step of re-routing the flow of compressed air from said conduit to the brake line through the flow amplifier when the internal pressure of said conduit decreases to a predetermined level so that the flow amplifier draws an additional flow of air from the atmosphere into the flow amplifier and directs said flows of air into the brake line of said first vehicle.

8. The method as defined in claim 3 wherein said step of redirecting is carried out by automatic control means adapted to switch the flow of compressed air directed into the brake line of the first vehicle from a route directed through the flow amplifier to a route bypassing the flow amplifier in response to an elevation of the internal pressure of the brake line to the predetermined level.

9. A method for charging the brake lines of a train of railway vehicles having an air-actuated braking system and an operating air pressure level, said method comprising the steps of:
  providing an airflow amplifier having an inlet and outlet;
  directing a flow of compressed air having a pressure at least as high as the operating air pressure level through the inlet of a flow amplifier and into the brake line of a first of the vehicles so that the flow amplifier draws an additional flow of air from the atmosphere into the flow amplifier and directs said flows of air into said first vehicle brake line at a charging pressure below the operating air pressure level;
  coupling the brake lines of uncoupled railway vehicles together in series relationship beginning with the coupling of the brake lines of the first and a next adjacent uncoupled railway vehicles and ending with the coupling of the brake lines of the next-to-last and last uncoupled railway vehicles in the train after which the pressure in the coupled brake lines begins to elevate above the charging pressure; and
  redirecting said flow of compressed air into said first vehicle brake line in a manner bypassing the flow amplifier when the internal pressure of the coupled brake line elevates to a predetermined level, which predetermined level is below the operating air pressure level of the coupled brake lines so that the flow amplifier is utilized during a period of charging during which low pressure air is directed into said first vehicle brake line until the internal pressure of the coupled brake lines elevates to the predetermined level and so that the flow amplifier is bypassed during another period of charging in which the pressure of the coupled brake lines is elevated from the predetermined level to the operating pressure of the coupled brake lines.

10. The method as defined in claim 9 wherein the brake line of the last uncoupled railway vehicle is open to the atmosphere at the outset of the coupling step and said redirecting step is preceded by a step of sealing the brake line of the last railway vehicle from the atmosphere so that the coupled brake lines are thereby sealed from the atmosphere.

11. The method as defined in claim 9 wherein said step of coupling includes a step of ensuring that air which enters said first vehicle brake line exits the brake line of each uncoupled railway vehicle which is operatively and sequentially coupled in series relationship to the brake line of the first railway vehicle.

12. The method as defined in claim 9 wherein said step of coupling is preceded by the steps of providing a conduit containing air under pressure from a compressed air source, routing a flow of compressed air from said conduit into said first vehicle brake line in a manner bypassing the flow amplifier and said step of directing includes a step of re-routing the flow of compressed air from said conduit through the inlet of the flow amplifier when the internal pressure of said conduit decreases to a preselected level so that the flow amplifier draws an additional flow of air from the atmosphere into the flow amplifier and directs said flows of air into said first vehicle brake line.

13. An apparatus for use when charging the brake lines of a train of railway vehicles having an air-actuated braking system, said apparatus comprising:
  means defining a high pressure conduit being connectable to a source of compressed air under high pressure for receiving air from the compressed air source;
  means defining an exit conduit being connectable to the brake line of a first railway vehicle of the train for directing air into the brake line;
  a flow amplifier having an inlet and an outlet, said inlet being in flow communication with said entry conduit and said outlet being in flow communication with said exit conduit;
  means defining a high pressure conduit having two ends, one of said ends being in flow communication with said entry conduit and the other of said ends being in flow communication with said exit conduit; and
  valving means associated with the high pressure conduit and flow amplifier for selectively routing air directed between the entry and exit conduits through the flow amplifier or through the high pressure conduit so that when said entry and exit conduits are operatively connected between the source of compressed air and the brake line of the first railway vehicle, a flow of air from the compressed air source can be selectively routed into the brake line of the first vehicle through the flow amplifier in a manner bypassing said high pressure conduit for conserving air from the compressed air source or through the high pressure conduit in a manner bypassing said flow amplifier for delivering air at a higher pressure to the brake line of the first vehicle.

14. The apparatus as defined in claim 13 further comprising means associated with said exit conduit for sensing the internal pressure of the brake line of the first railway vehicle.

15. The apparatus as defined in claim 13 wherein said valving means includes:
  a first valve operatively associated with said high pressure conduit and operable between an open condition at which a flow of air directed through said high pressure conduit is permitted and a closed condition at which a flow of air through said high pressure conduit is prevented; and a second valve operatively associated with the inlet of the flow amplifier and operable between an open condition at which a flow of air directed between said entry conduit and said flow amplifier inlet is permitted and a closed condition at which a flow of air between said entry conduit and said flow amplifier inlet is prevented; and a third valve operatively associated with the outlet of the flow amplifier and operable between an open condition at which a flow of air directed between said flow amplifier outlet and said exit conduit is permitted and a closed condition at which a flow of air between said flow amplifier outlet and said exit conduit is prevented so that when said first valve is closed and said second and third valves are open, air routed from the entry conduit to the exit conduit travels through the flow amplifier and when said second and third conduits are closed and said first conduit is open, air routed from the entry conduit to the exit conduit travels through the high pressure conduit.

16. The apparatus of claim 15 further comprising means connected between the first, second and third valves for closing the first valve and opening the second and third valves to thereby route air from the entry conduit to the exit conduit through the flow amplifier and for opening the first valve and closing the second and third valves to thereby route air from the entry conduit to the exit conduit through the high pressure conduit in a manner bypassing the flow amplifier.

17. The apparatus of claim 15 wherein said apparatus includes means connected between the first, second and third valves for closing said first valve and opening said second and third valves in response to a reduction in internal pressure of said exit conduit by a preselected amount and for opening said first valve and closing said second and third valves in response to an elevation in internal pressure of said exit conduit to a predetermined level.

18. The apparatus as defined in claim 17 wherein said means connected between the first, second and third valves includes a pressure transducer.

* * * * *